United States Patent
Takasaki et al.

[11] Patent Number: 4,604,745
[45] Date of Patent: Aug. 5, 1986

[54] METHOD OF SEARCHING FAULT LOCATIONS IN DIGITAL TRANSMISSION LINE

[75] Inventors: Yoshitaka Takasaki, Tokorozawa; Kiichi Yamashita, Kanagawa; Yasushi Takahashi, Hachioji, all of Japan

[73] Assignee: Hitachi, Ltd., Tokyo, Japan

[21] Appl. No.: 578,791

[22] Filed: Feb. 10, 1984

[30] Foreign Application Priority Data

Mar. 11, 1983 [JP] Japan ................................. 58-40455
Dec. 28, 1983 [JP] Japan ................................ 58-246931

[51] Int. Cl.⁴ ............................................. H04B 3/46
[52] U.S. Cl. .............................. 371/22; 179/175.31 R
[58] Field of Search ................. 371/22; 179/175.31 R, 179/175.3 F

[56] References Cited

U.S. PATENT DOCUMENTS 3,586,968 6/1971 Barjot ............................... 371/22 X
3,895,352 7/1975 Chisholm et al. ..................... 371/22
4,022,988 5/1977 Lentz et al. ................. 179/175.31 R
4,278,850 7/1981 Sato et al. .................. 179/175.31 R
4,354,054 10/1982 Bellisio ....................... 179/175.31 R
4,455,644 6/1984 Fox et al. .................... 179/175.31 R Primary Examiner—Charles E. Atkinson
Attorney, Agent, or Firm—Antonelli, Terry & Wands

[57] ABSTRACT

A method of searching fault locations which is employed in a transmission system comprising a transmitting terminal having a transmitter for transmitting a digital signal; a receiving terminal having a receiver for receiving the digital signal; a plurality of repeaters which are placed between the transmitting and receiving terminals, and each of which receives and amplifies the digital signal from a preceding repeater section and deliver it to a subsequent repeater section; and a plurality of transmission lines for connecting the transmitter with the first repeater, the repeaters with each other and the final repeater with each other and the final repeater with the receiver, respectively. This method comprises the steps of coding an original signal to be transmitted in terms of two kinds of error detecting codes at the transmitting terminal to send out them from the transmitter; detecting an error of a received signal using one of the two kinds of error detecting codes at each repeater thereby to measure the error rate at one repeater section corresponding to each repeater; recoding a decoded received signal using the error detecting code employed to detect the error, and delivering it to a subsequent repeater section, and transmitting signals each of which represents the error rate at each repeater section measured at each repeater, to the transmitting terminal or receiving terminal.

29 Claims, 14 Drawing Figures

METHOD OF SEARCHING FAULT LOCATIONS IN DIGITAL TRANSMISSION LINE

This invention relates to a method of searching fault locations in a digital transmission line and more particularly to a searching method which permits speedy detection of faulty repeaters in the digital transmission line.

As a digital transmission line, a coaxial cable, radio relay or millimeter waveguide was commonly used, but recently a fiber optic PCM transmission line using an optical fiber has been more commonly used. The fiber optic PCM transmission line involves a system which converts a signal into an optical pulse. A semiconductor laser is excited by a PCM signal current to be transmitted thereby to generate the optical pulse. This optical pulse is transmitted through the optical transmission line. Where repeaters exist along the transmission line, the optical pulse is once again converted into an electrical signal, this electrical signal is restored to an optical pulse again by the excitation of the semiconductor laser, and the thus formed optical pulse is fed to a subsequent repeater section in the transmission line.

Since such an optical transmission uses devices such as a semiconductor laser diode, light emitting diode, etc. the effectiveness of which has not yet been sufficiently proved, the search of faulty repeaters is particularly important as compared with the conventional electrical communication. Recently, it has been required to perform the search while the system is in-service.

In order to search for faulty repeaters while the system is in-service in the conventional digital transmission system, it is necessary to measure an error rate at each of the repeaters, and calculate an error rate at each repeater section using the thus measured error rate thereby to determine the repeater section in which a critical error occurs (refer to the article entitled "A method of supervising error rates at repeaters in-service in an optical transmission system" by Yamashita and Hakamada in a manuscript of lecture No. 2234 of the general national conference in 1980 by the Institute of Electronics and Communication Engineers of Japan).

Now, explanation will be made on the method of searching for fault locations which has been conventionally performed.

The digital signal delivered from a transmitter in a transmitting terminal becomes deteriorated as it travels along a transmission line, but the deteriorated signal is amplified by a repeater and the amplified signal is fed to a subsequent repeater section. In case this function of repeating is accompanied by any fault, it is necessary to remotely search for the repeater in which the fault occurs, from the transmitting terminal or a receiving terminal. To this end, the transmitted signal is subjected to a line coding with error detection capability, and the thus detected error is transmitted to the transmitting terminal or the receiving terminal through a fault signal transmitter, using a twisted pair cable. The transmitting terminal or receiving terminal totalizes the error detected at each repeating point (repeater) and calculates the error rate difference between adjoining repeating points to obtain the error rate at each repeater section, thereby determining the repeater section where the fault occurs. The error information produced from each repeating point is reported by a signal having a specific frequency or address for the respective repeater sections, which allows the receiving terminal or transmitting terminal to discriminate the repeating point, from which the error information is transmitted. This method requires a calculating of the error rate difference between the adjoining repeating points, and hence in order to estimate the repeating point where the maximum error rate occurs, it is necessary to measure the error rate at every repeater and calculate every error rate difference. This method requires more time and labor, and so it is not practical.

An object of this invention is to overcome the problem in the conventional method mentioned above and to provide a method of searching fault locations in a digital transmission line which can reduce search time and labor by easy detection of the fault locations.

This object is achieved by a method of searching fault locations which is employed in a transmission system comprising a transmitting terminal having a transmitter for transmitting a digital signal; a receiving terminal having a receiver for receiving the digital signal; a plurality of repeaters which are placed between the transmitting and receiving terminals, and each of which receives and amplifies the digital signal from a preceding repeater section and delivers it to a subsequent repeater section; and a plurality of transmission lines for connecting the transmitter with the first repeater, the intermediate repeaters with each other and the final repeater with the receiver, respectively; and which comprises the steps of coding an original signal to be transmitted in terms of at least one kind of error detecting code at the transmitting terminal and sending it out from the transmitter; detecting an error of a received signal using the one kind of error detecting code at each repeater thereby to measure the error rate at one repeater section corresponding to each repeater; recoding a decoded received signal using the error detecting code employed to detect the error, and delivering the recoded signal to the subsequent repeater section; and transmitting signals, each of which represents the error rate at each repeater section measured at each repeater, to the transmitting terminal or receiving terminal.

In accordance with one feature of this invention two kinds of error detecting codes are combined to be used, and one of the error detecting codes is recoded, which permits the error rate at one repeater section corresponding to each repeater to be discretely measured and the receiving terminal to count the overall error rate of the transmission line. Thus, the fault location can be swiftly detected from the error rate at each repeater, which results in a substantial reduction of time and cost taken to search the fault locations.

The present invention will be apparent from the following detailed description taken in conjunction with the accompanying drawings, in which:

FIG. 1, comprised of FIGS. 1a–1g, is a time chart showing an example of the coding and decoding of a transmission signal in accordance with this invention;

Figure 3:
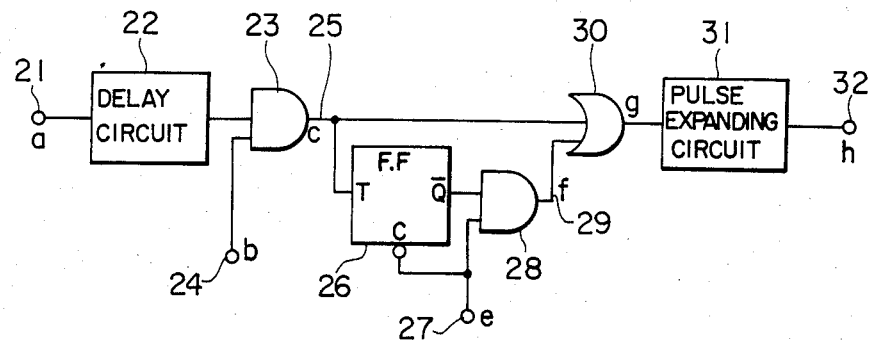
FIG. 3 is a block diagram of one example of a parity coder used to implement this invention.
Figure 4:
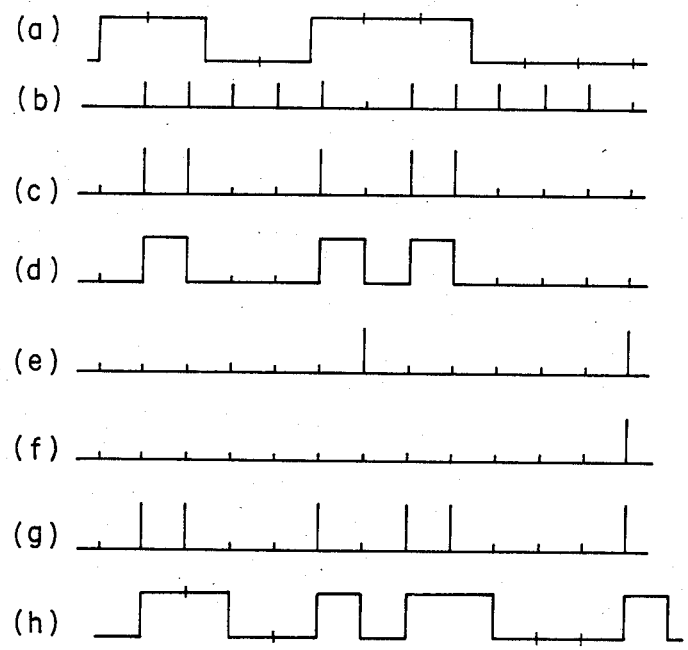
Figure 5:
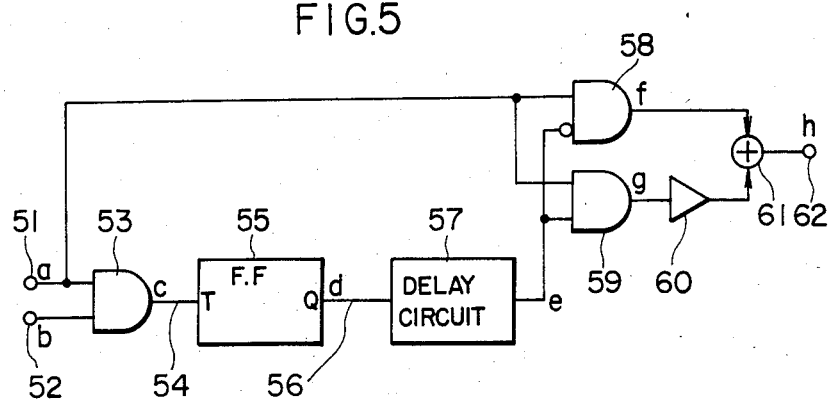
Figure 6:
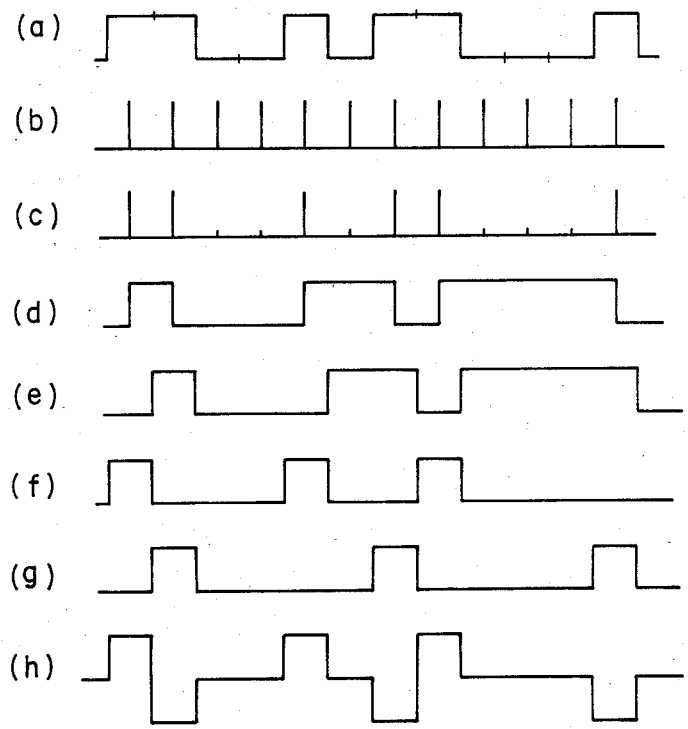
Figure 7:
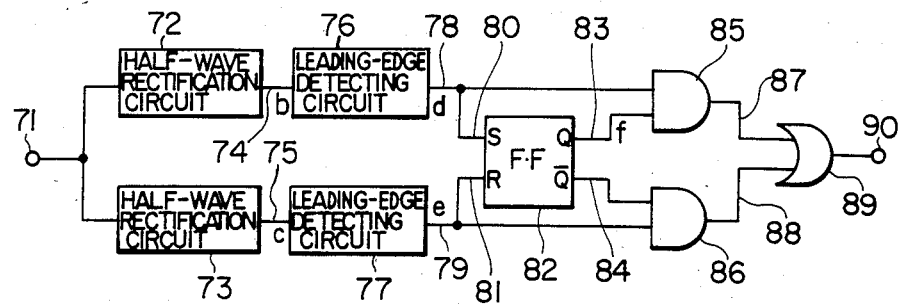
Figure 8:
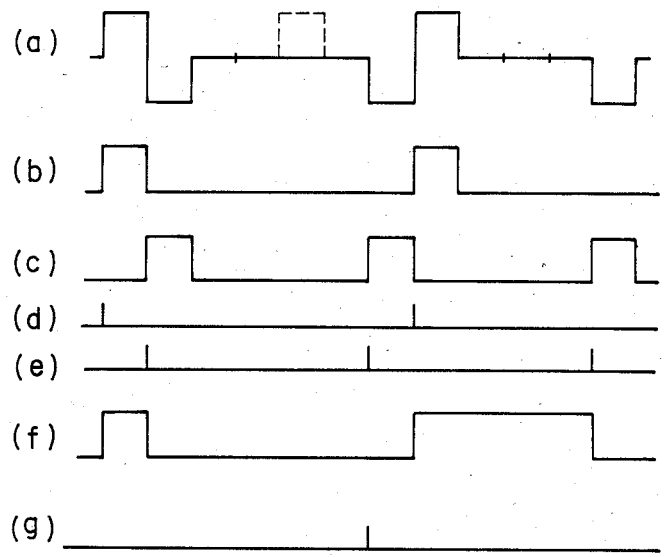
Figure 9:
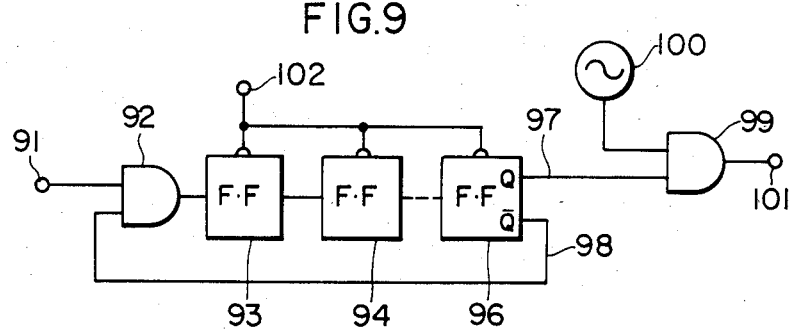
Figure 10:
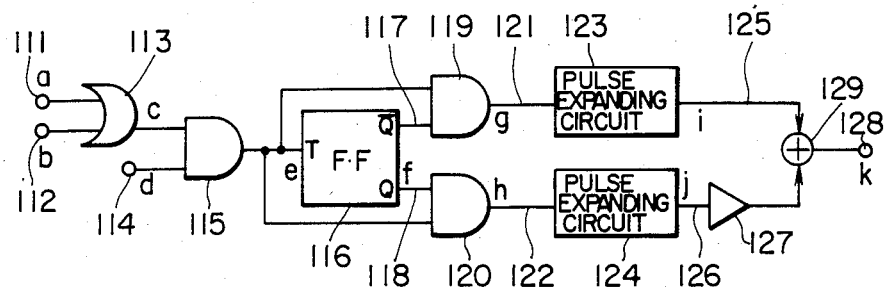
Figure 11:
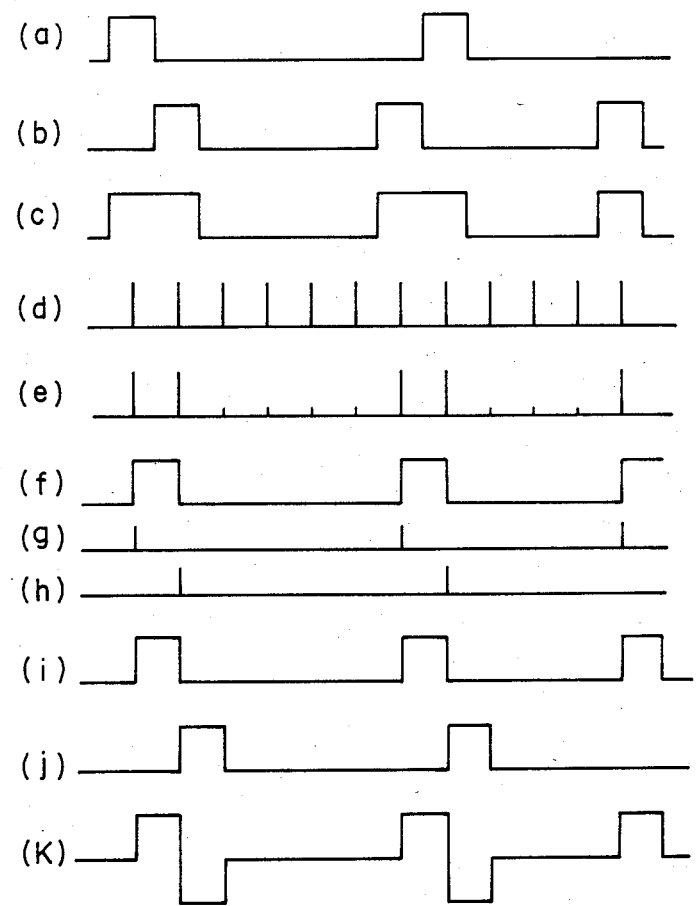
Figure 12:
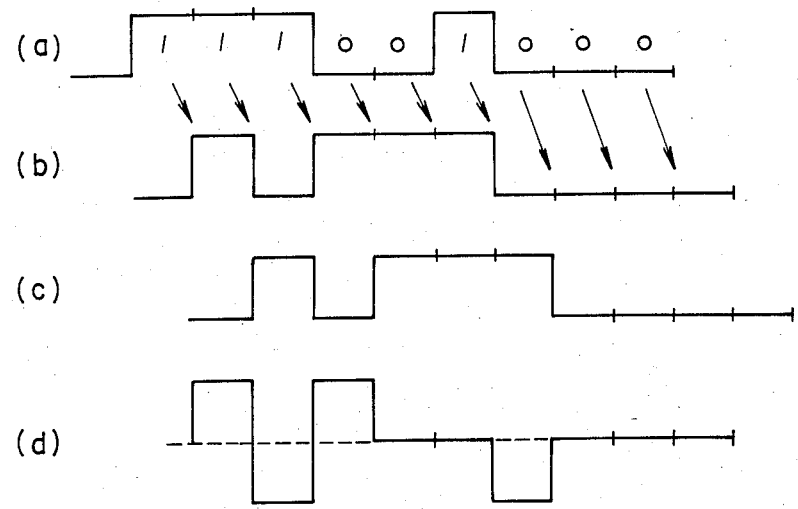
Figure 13:
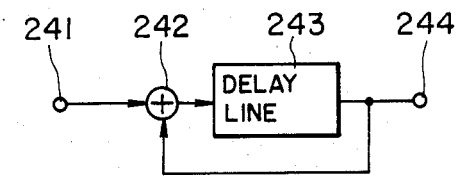
Figure 14:
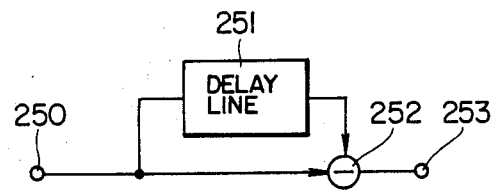

FIG. 4, comprised of FIGS. 4a–4h, is a time chart for explaining the operation of the circuit of FIG. 3;

FIG. 5 is a block diagram of one example of an AMI coding circuit employed to execute this invention;

FIG. 6, comprised of FIGS. 6a–6h, is a time chart for explaining the operation of the circuit of FIG. 5;

FIG. 7 is a block diagram of one example of an error detecting circuit used to implement this invention;

FIG. 8, comprised of FIGS. 8a–8g, is a time chart for explaining the operation of the circuit of FIG. 7;

FIG. 9 is a block diagram of one example of an error register and a fault signal transmitter which are used to execute this invention;

FIG. 10 is a block diagram of one example of a recoding circuit used to implement this invention;

FIG. 11, comprised of FIGS. 11a–11k, is a time chart for explaining the operation of FIG. 10;

FIG. 12, comprised of FIGS. 12a–12d, is a time chart exemplifying the coding and decoding by the other code in accordance with this invention; and FIGS. 13 and 14 show a coder and decoder which are used for the coding and decoding in FIG. 12, respectively.

Figure 1:
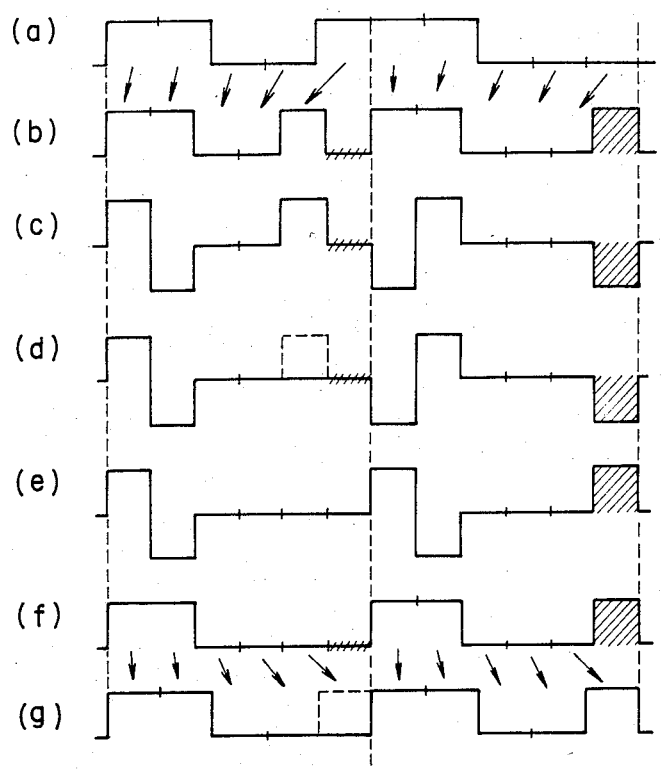
Figure 2:
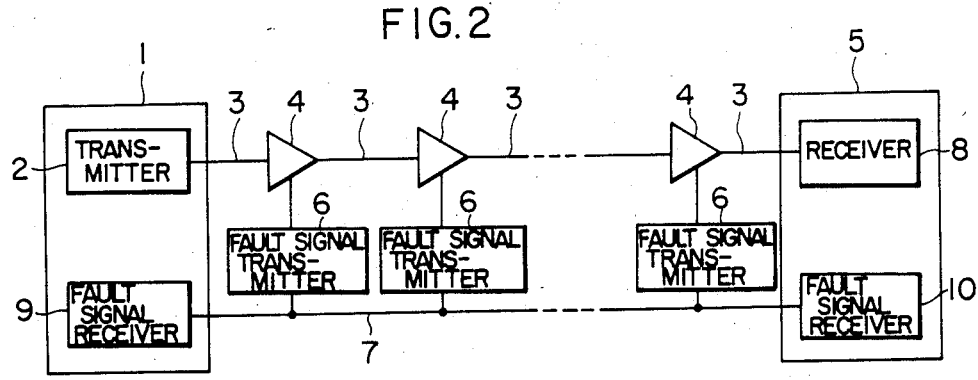
FIG. 2 is a flow diagram of one example of the digital transmission system in which this invention is put into practice.

The coding process of a transmission signal in accordance with this invention is illustrated in FIG. 1, and the digital transmission system in which this invention is used is illustrated in FIG. 2.

The transmission system of FIG. 2 includes a transmitting terminal 1 having a transmitter 2 for transmitting a digital signal; a receiving terminal 5 having a receiver 8 for receiving the digital signal; a plurality of repeaters 4, 4, . . . which are placed between the transmitting and receiving terminals, and each of which receives and amplifies the digital signal from a preceding repeater section and delivers it to a subsequent repeater section; and a plurality of transmission lines 3, 3, . . . for connecting the transmitter 2 with the first repeater 4, the repeaters with each other and the final repeater 4 with the receiver 8, respectively.

A fault signal transmitter 6 provided for each repeater (repeating point) serves to transmit error information to a fault signal receiver 10 in the receiving terminal 5 or a fault signal receiver 9 in the transmitting terminal 1 through a fault signal transmission cable 7. The cable 7 is usually twisted around the transmission lines 3, 3 . . . . The repeater functions to perform an AMI (Alternate Mark Inversion) recoding for the received signal to deliver it to a subsequent repeater section.

FIG. 1(a) shows an original code. This code is parity-coded in the transmitting terminal 1 so that it may be error-detectable, as shown in FIG. 1(b). One block includes 6 bits—the correspondences are shown by arrows—and a parity pulse is inserted into a part indicated by oblique lines so that the number of pulses in a block may be odd (odd parity). FIG. 1(b) shows two blocks in which a parity pulse is not inserted in the first block since three pulses exist therein while a parity pulse (indicated by oblique lines) is inserted in the second block since two (even) pulses exist therein.

Next, AMI coding is applied to the parity-coded signal so that AMI coded signal is obtained as shown in FIG. 1(c). The transmitter 2 transmits the AMI coded signal to a transmission line.

Usually, the low frequency signal component of the signal is cut off by a transformer or capacitor in transmission line 3; hence the code shown in FIG. 1(b) gives rise to DC variations in a reshaped pulse train as well as drifts depending on the mark ratio of the pulse train and these make the discrimination and regeneration thereof difficult. In order to obviate this difficulty, the AMI code (bipolar code) is used, the polarity of which code is inverted for each pulse from positive to negative or vice versa, and the spectrum of which is of the maximum energy near one-half of the pulse repetition frequency.

When an error does not occur while the AMI coded signal is transmitted through the transmission line 3, this coded signal is transmitted as it is. However, when such an error as shown by the dotted lines in FIG. 1(d) occurs due to the noise in the transmission line 3, the repeater 4 detects this error and counts it, and recodes the signal so as to meet the AMI law thereafter to transmit it to a subsequent repeater section. That is, the error for each repeater section is detected on the basis of the violation of the AMI law and the number of errors occurring in one second (error rate) is counted. Thereafter, in such a case as FIG. 1(d) where one pulse is lost recoding is applied so that all polarities of the pulses in the subsequent train are inverted. This is effected in such a manner that the waveform shown in FIG. 1(d) is once decoded and then coded again according to the AMI law. Therefore, the error rate in the subsequent repeater section can be detected without being influenced by errors in the preceding section.

On the other hand, the error rate over the entire transmission line can be detected through parity-check, after decoding the AMI signal, as seen from FIG. 1(f), at the receiving terminal 5. This may be always supervised by the receiver 8.

The errors at the repeater section are detected and counted at each repeater (repeating point). When the number of counted errors exceeds a predetermined level, a fault signal is transmitted from the fault signal transmitter 6. Thus, it is possible to estimate the repeater section where the fault occurs, by receiving the fault signal at the fault signal receiver 9 or 10. And it is easy to discriminate the repeater section having the faulty repeater by using fault signals which are allocated different frequencies corresponding to respective repeater sections. Also, the fault signal can be discriminated by allocating addresses.

FIGS. 3 to 11 are diagrams showing the embodiments of respective elements or parts of FIGS. 1 and 2. FIGS. 3 and 4 are a block diagram of a parity coder used for this invention and a time chart for explaining the operation thereof, respectively.

The code of FIG. 1(a) is coded into an odd number parity code of FIG. 1(b) by the parity coder of FIG. 3.

An original signal such as shown in FIG. 4(a) is supplied from an input terminal 21, phase-adjusted by a delay circuit 22 and applied to a logical product (AND) gate 23.

On the other hand, this gate 23 is supplied with a clock pulse b such as shown in FIG. 4(b). Thus, a waveform c such as shown in FIG. 4(c) appears at an output terminal 25. Clock pulse b is suppressed for one time slot at the end of respective blocks so that a parity pulse may be inserted there. The output waveform c from the gate 23 is directly applied to a logical sum (OR) gate 30 and at the same time applied to a trigger type flip-flop 26. The trigger type flip-flop 26 is reset each time a parity clock e such as shown in FIG. 4(e) is applied from a terminal 27. Thus, the trigger type flip-flop repeats a set/reset operation each time a pulse appears in the pulse train c shown in FIG. 4(c), and is reset by the parity clock e, with the result that a waveform d such as shown in FIG. 4(d) is obtained. A logical product between the inversion of the waveform d, a waveform $\overline{Q}$ and the parity clock e is obtained by a gate 28, and a parity pulse f appears at an output terminal 29.

Taking a logical sum between the logical product output pulse c and the parity pulse f at a logical sum gate 30 produces a pulse train g such as shown in FIG. 4(g) at the output terminal thereof. This pulse train is applied to a pulse expanding circuit 31, with the result that an NRZ (Non Return to Zero) pattern h added with parities is obtained at an output terminal 32. The NRZ pattern of FIG. 4(h) is a code added with parities shown in FIG. 1(b). Thus, the odd parity code is formed.

FIGS. 5 and 6 are a block diagram of an AMI coding circuit used for implementing this invention and a time chart for explaining the operation thereof, respectively.

The NRZ pulse train a added with parities which is obtained by the circuit of FIG. 3 is applied to an input terminal 51 of the AMI coding circuit of FIG. 5 while a clock pulse b such as shown in FIG. 6(b) is applied to a terminal 52 thereof. Thus, the logical product between the pulse train a and the clock pulse b is obtained in the gate 53 and such a waveform c as shown in FIG. 6(c) appears as an output 54. This waveform c is applied to a trigger type flip-flop 55, and then such a waveform d as shown in FIG. 6(d) appears as an output 56. The waveform e obtained by delaying the output 56 in a delay circuit 57 is applied to a logical product gate 59 while the inverted waveform thereof is applied to a logical product gate 58. Both logical product gates 58 and 59 are supplied with the input signal a. The logical product gate 59 takes a logical product between the input signal a and the delayed waveform e to obtain a waveform g as an output. The logical product gate 58 takes a logical product between the input signal a and an inversion waveform of the delayed waveform e to obtain a waveform f as an output. An adder 61 adds the waveform f and an inversion waveform of the waveform g obtained by an inverter 60 thereby to obtain an AMI code the polarity of which is inverted for every pulse, at an output terminal 62.

The thus formed AMI code shown in in FIG. 1(c) is transmitted from the transmitter 2 of the transmitting terminal 1 to the transmission line 3.

Next, explanation will be made on the operation of a processing circuit in each repeater 4.

FIGS. 7 and 8 are a block diagram of an error detecting circuit used to implement this invention and a time chart for explaining the operation thereof, respectively.

It is assumed that a pulse removal type error in the AMI pulse train has occurred during the transmission as seen from FIG. 8(a).

When the AMI signal is applied to an input terminal 71 in the error detecting circuit, it is rectified to a positive polarity part and a negative polarity part by half-wave rectification circuits 72 and 73, respectively. And rectified waveforms b and c such as shown in FIGS. 8(b) and 8(c) appear at outputs 74 and 75. These waveforms b and c are applied to leading-edge detecting circuits 76 and 77 to take out pulse trains d and e respectively representing the leading edges of the waveforms b and c, as outputs 78 and 79 (FIGS. 8(d) and 8(e)). The pulse trains d and e are applied to logical product gates 85 and 86, respectively, and simultaneously are applied to input terminals 80 and 81 of a set-reset type flip-flop 82, respectively. The flip-flop 82 is set each time the pulse of FIG. 8(d) is inputted, while it is reset each time the pulse of FIG. 8(e) is inputted. Thus, a waveform f such as shown in FIG. 8(f) appears at an output 83 while an inversion waveform of the waveform f appears at an output 84. A logical product gate 85 takes a logical product between the pulse train d and the waveform f while a logical product gate 86 takes a logical product between the pulse train e and the inverted waveform of the waveform f. And a logical sum gate 89 takes a logical sum between the outputs from the gates 85 and 86 thereby to obtain an error pulse g. Taking a logical product between the pulses of FIGS. 8(d) and 8(f) provides no output at an output 87 since the pulse d is not included in the positive polarity period of the waveform f. On the other hand, taking a logical product between the pulse of FIG. 8(e) and the inversion waveform of the waveform f provides a pulse g of FIG. 8(g) since a second pulse of the pulse e is included in the positive polarity period in the inversion waveform (f) of the waveform f. Resultantly, the pulse g appears at an output terminal 90. Thus, error detection can be achieved.

FIG. 9 illustrates a circuit consisting of an error register and a fault signal transmitter. In this circuit, the error pulse g of FIG. 8(g) applied to an input terminal 91 is automatically registered by counters (flip-flops) 93–96 through a logical product gate 92. For example, after the application of a start signal to a terminal 102 has reset all the flip-flops 93, 94 and 96, the application of the error pulse g to an input terminal 91 sets the flip-flop 93 corresponding a first bit past the gate 92. The application of a next error pulse g to the terminal 91 resets the first bit flip-flop 93, and the second bit flip-flop 94 is set. Thus, the number representing an overflow output, i.e., the maximum number of the error pulses to be registered can be optionally determined by increasing the number of the flip-flops.

When the number of the input error pulses g exceeds a predetermined number, output terminal 97 of a final stage 96 becomes "H" (high level) while another output terminal 98 thereof becomes "L" (low level). Thus, the gate 92 is inhibited and the registration of errors is stopped. On the other hand, a logical product gate 99 is opened because a Q output 97 becomes "H". Thus, a signal from an oscillator 100 is allowed to pass through the gate 99 so that a fault signal is transmitted from an output terminal 101 to the transmission cable. Alloting a different signal frequency of the oscillator 100 for each repeater allows the repeater, from which the fault signal is transmitted, to be discriminated.

The application of the start signal to the input terminal 102 resets all of the flip-flops, and error registration is started again.

Thus, the operations of error detection, error counting and transmission of a fault signal are automatically performed at each repeater.

A checking operation at the receiving terminal will be explained hereinafter.

FIGS. 10 and 11 are a block diagram of a recoding circuit employed to implement this invention and a time chart for explaining the operation thereof.

The AMI signal received by the receiver 8 in the receiving terminal 5 is applied to half-wave rectification circuits relative to a positive polarity part and a negative polarity part thereof, respectively, from which rectified waveforms a and b are derived (FIGS. 11(a) and 11(b)). Such an operation is the same as that in each repeater, and so these waveforms a and b are equivalent to the waveforms b and c shown in FIGS. 8(b) and 8(c).

The respective application of the rectified waveforms a and b to input terminals 111 and 112 allows a logical sum gate 113 to provide a logical sum output waveform c (FIG. 11(c)). This means conversion of the AMI signal to an NRZ (Non Return to Zero) code added with parities. Next, the application of this output waveform c to a logical product gate 115 as well as that of a clock d from input terminal 114 provides a sampled waveform e as an output (FIG. 11(e)). The application of this sampled waveform e to a trigger type flip-flop 116 gives rise to a waveform f shown in FIG. 11(f) at an output terminal 118. A logical product gate 119 takes a logical product between the inversion of the waveform f and the sampled waveform e, which provides a pulse waveform g shown in FIG. 11(g). A logical product gate 120 takes a logical product between the waveform f and the sampled waveform e, which provides a pulse waveform h shown in FIG. 11(h). Further, the waveform f is slightly delayed by the flip-flop 116 so that it can take a coincidence with the waveform e immediately before the trailing edge of the waveform f while the sampled waveform e which occurred immediately before the leading edge of the waveform f can not take a coincidence with the waveform f. Causing the logical product output waveforms g and h to pass through pulse expanding circuits 123 and 124, respectively provides waveforms i and j at terminals 125 and 126. Incidentally, the time constants of the pulse expanding circuits 123 and 124 are predetermined to be the same time as the period of the clock pulse d. An adder 129 adds an inversion of the waveform j obtained through an inverter 127 and the waveform i, which provides a recoded waveform k at an output terminal 128.

This waveform k corresponding to the waveform e shown in FIG. 1(e) is converted to an NRZ code added with parities shown in FIG. 1(f) and thereafter is subjected to parity check. Thus, the disappearance of the pulse indicated by dashed lines in FIG. 1(g) can be detected.

The example in which both AMI code and parity code are used has been described hereinbefore. However, it is evident that any kinds of codes can be combined, provided that two kinds of codes are orthogonal with each other, or are not influenced by each other. For example, using both parity code and a two-level AMI code, in which the two-level AMI code ("1" is converted to "11" or "00" while "0" is converted "10" or "01") sent from the transmitting terminal is duobinary shaped by a roll-off filter at a receiving terminal to obtain the AMI code—allows the fault location searching method according to the present invention to be applied in such a transmission system as optical communications in which the use of two-level code is desirable at the transmitter. The above transmission system using a two-level AMI code is described in the article entitled "Optical pulse formats for fiber optic digital communications" in IEEE Trans on Commun. COM-24 No. 4 pp 404-413, 1976 April. The above two-level code, by which "1" is converted into "11" or "00" while "0" is converted into "10" or "01", is called a DMI (Differential Mark Inversion) code and so is hereinafter referred to as the DMI code.

Where it is desirable that the waveform of modulating a semiconductor laser takes two levels, as in optical communications, DMI coding is performed at a transmitting terminal and the DMI code is converted into the AMI code at a receiving terminal by means of narrowband shaping. The DMI code is also employed for recoding at repeating points.

However, the DMI code is not suitable for such a system which uses an optical device such as light emitting diodes (LED). This is because the DMI code requires a double modulating speed as compared with the NRZ code while the optical device such as a light emitting diode finds difficulty in adapting to the high-modulating speed. In these circumstances, it is necessary to provide a coding system having the modulating speed substantially equal to that of the NRZ coding.

To this end, in the other embodiment of this invention, precoding is adapted to the NRZ pulse train at the transmitting terminal, i.e., signals "1" and "0" are converted into a transition and no transition (or vice versa). These converted signals undergo a differentiation shaping at the receiving terminal to obtain an AMI code. This enables the search of fault locations.

The embodiment of this invention will be explained referring to FIGS. 12-14. The application of an original signal such as shown in FIG. 12(a) to an input terminal 241 of the precoder shown in FIG. 13 gives rise to an output coded as shown in FIG. 12(b) at an output terminal 244. This latter signal which is the result of modulo two addition of the input signal and the output signal by a modulo two adder 242 is delayed by one bit by a delay line 243. As shown by arrows, "1" and "0" of the original signal a shown in FIG. 12(a) correspond to a transition and no transition of the waveform b shown in FIG. 12(b).

The waveform shown in FIG. 12(b) which is also assumed to be the received waveform is applied to an input terminal 250 of the decoder shown in FIG. 14 and delayed by a delay circuit 251 with the result that a waveform c such as shown in FIG. 12(c) is obtained. Subtracting the delayed waveform c from the non-delayed waveform b by a subtracter 252 provides a waveform d such as shown in FIG. 12(d). This waveform d is an AMI pulse train in which "1" and "−1" correspond to "1" of the original signal while "0" corresponds to "0" of the original signal.

Thus, the AMI waveform is obtained at the receiving terminal, which allows the search of fault locations according to the method described above. That is, the detection of a violation of the AMI code in each repeater—an AMI code alternately gives "1" and "−1" in a normal state and hence any state other than this state means a violation—permits the fault condition of each repeater section to be searched. This can be carried out in such a manner that the AMI code is once converted to an NRZ code at each repeater, precoded again and transmitted to a subsequent repeater section.

Further, using parities in the pulse train enables the transmission error in the entire repeater section to be supervised.

As described above in accordance with the embodiment of this invention, the search of fault locations can be carried out with the modulating speed substantially equivalent to that in the NRZ code. It is therefore very meritorious to adapt this invention to the transmission system in which the modulating speed is restricted due to the light emitting diodes or the like.

We claim:

1. A method of searching fault locations in a transmission system comprising a transmitting terminal having a transmitter for transmitting a digital signal; a receiving terminal having a receiver for receiving the digital signal; a plurality of repeaters which are placed between the transmitting and receiving terminals, and each of which receives and amplifies the digital signal from a preceding repeater section and delivers it to a subsequent repeater section; and a plurality of transmission lines for connection of the first repeater to the transmitter, for connection of the repeaters with each other, and for connection of the final repeater with the receiver, respectively; said method comprising the steps of:

coding an original signal to be transmitted in terms of an error detecting code at the transmitting terminal to send it out from the transmitter;

detecting an error or a received signal using said error detecting code at each repeater thereby to measure the error rate of one repeater section corresponding to each repeater;

recoding a decoded received signal using said error detecting code employed to detect the error, and delivering it to a subsequent repeater section; and transmitting signals each of which represents said error rate at each repeater section measured at each repeater, to the transmitting terminal or receiving terminal.

2. A method of searching fault locations in a transmission system according to claim 1, wherein said codes are a parity error detecting codes are a parity code is an Alternate Mark Inversion (AMI) code.

3. A method of searching fault locations in a transmission system according to claim 1 wherein said error detecting code is a two-level AMI code.

4. A method of searching fault locations in a transmission system according to claim 3, wherein the two-level AMI code received in each repeater is converted into an AMI code.

5. A method of searching fault locations in a transmission system according to claim 1 wherein said error detecting code is a transition precode.

6. A method of searching fault locations in a transmission system according to claim 5, wherein the received transition precode is converted into an AMI code in each repeater.

7. A method of searching fault locations in a transmission system according to claim 1, wherein said signals each of which represents said error rate at each repeater section measured at each repeater are of different frequencies for the respective repeaters.

8. A method of searching fault locations in a transmission system according to claim 7, wherein said signals each of which represents said error rate at each repeater section measured at each repeater are transmitted to said transmitting terminal or receiving terminal when said error rate exceeds a predetermined value.

9. A method of searching fault locations in a transmission system according to claim 1, wherein said signals each of which represents said error rate at each repeater section measured at each repeater are transmitted to said transmitting terminal or receiving terminal when said error rate exceeds a predetermined value.

10. A method of searching fault locations in a transmission system comprising a transmitting terminal having a transmitter for transmitting a digital signal; a receiving terminal having a receiver for receiving the digital signal; a plurality of repeaters which are placed between the transmitting and receiving terminals, and each of which receives and amplifies the digital signal from a preceding repeater section and delivers it to a subsequent repeater section; and a plurality of transmission lines for connecting the transmitter with the first repeater, the repeaters with each other, and the final repeater with the receiver, respectively; said method comprising the steps of:

coding an original signal to be transmitted in terms of two kinds of error detecting codes at the transmitting terminal to send them out from the transmitter;

detecting an error or a received signal using one of said two kinds of error detecting codes at each repeater thereby to measure the error rate at one repeater section corresponding to each repeater;

recoding a decoded received signal using said error detecting code employed to detect the error, and delivering it to a subsequent repeater section;

transmitting signals each of which represents said error rate at each repeater section measured at each repeater, to the transmitting terminal or receiving terminal; and detecting an error of a received signal using the other of said two kinds of error detecting codes at the receiving terminal thereby to measure an overall error rate over the entire sections.

11. A method of searching fault locations in a transmission system according to claim 10, wherein said signals each of which represents said error rate at each repeater section measured at each repeater are transmitted to said receiving terminal so that informations on the error rate of each repeater section and the overall error rate are collected in the receiving terminal.

12. A method of searching fault locations in a transmission system according to claim 11, wherein said signals each of which representing said error rate at each repeater section measured at each repeater are multiplexed in signals transmitted by said transmission system and transmitted to said receiving terminal.

13. A method of searching fault locations in a transmission system according to claim 10, wherein said signals each of which represents said error rate at each repeater section measured at each repeater, and the signal representing the overall error rate, measured at said receiving terminal are transmitted to said transmitting terminal so that informations on the error rate of each repeater section and the overall error rate are collected in the transmitting terminal.

14. A method of searching fault locations in a transmission system according to claim 10, wherein said two kinds of error detecting codes are a parity code and an AMI code.

15. A method of searching fault locations in a transmission system according to claim 10 wherein said two kinds of error detecting codes are a parity code and a two-level AMI code.

16. A method of searching fault locations in a transmission system according to claim 15, wherein the two-level AMI code received in each repeater is converted into an AMI code.

17. A method of searching fault locations in a transmission system according to claim 10 wherein said two kinds of error detecting codes are a parity code and a transition precode.

18. A method of searching fault locations in a transmission system according to claim 17, wherein the received transition precode is converted into an AMI code in each repeater.

19. A method of searching fault locations in a transmission system according to claim 10, wherein said signals each of which represents said error rate at each repeater section measured at each repeater are of different frequencies for the respective repeaters.

20. A method of searching fault locations in a transmission system according to claim 19, wherein said signals each of which represents said error rate at each repeater section measured at each repeater are transmitted to said transmitting terminal or receiving terminal when said error rate exceeds a predetermined value.

21. A method of searching fault locations in a transmission system according to claim 10, wherein said signals each of which represents said error rate at each repeater section measured at each repeater are transmitted to said transmitting terminal or receiving terminal when said error rate exceeds a predetermined value.

22. A system for searching fault locations in a transmission system comprising a transmitting terminal having a transmitter for transmitting a digital signal; a receiving terminal having a receiver for receiving the digital signal; a plurality of repeaters which are placed between the transmitting and receiving terminals, and each of which receives and amplifies the digital signal from a preceding repeater section and delivers it to a subsequent repeater section; and a plurality of transmission lines for connecting the transmitter with the first repeater, the repeaters with each other, and the final repeater with the receiver, respectively; comprising:

a transmitter provided with means for coding an original signal to be transmitted in terms of two kinds of error detecting code and serves to transmit the coded signals;

a plurality of repeaters each of which is equipped with means for detecting an error of a received signal using one of said two kinds of error detecting codes thereby to measure the error rate at one repeater section corresponding to each repeater, and means for recoding a decoded received signal using said error detecting code employed to detect the error, and delivering it to a subsequent repeater section;

a receiver which is provided with means for detecting an error of a received signal using the other of said two kinds of error detecting codes thereby to measure an overall error rate of said transmission system and serves to receive the signals transmitted from said transmitter through said plurality of repeaters;

a plurality of fault signal transmitters each of which is connected with each repeater and serves to transmit a fault signal representing the error rate of each repeater section measured by each repeater;

a fault signal receiver which is installed in the transmitting terminal or receiving terminal and serves to receive said fault signals; and a transmission line for coupling said plurality of fault signal transmitters with said fault signal receiver.

23. A system for searching fault locations in a transmission system according to claim 22, wherein said transmitter includes means for coding an original signal in terms of a parity code and AMI code.

24. A system for searching fault locations in a transmission system according to claim 22, wherein said transmitter includes means for coding an original signal in terms of a parity code and two-level AMI code, and said repeater includes means for converting a received two-level AMI code into an AMI code.

25. A system for searching fault locations in a transmission system according to claim 22, wherein said transmitter includes means for coding an original signal in terms of a parity code and a transition precode, and said repeater includes means for converting a received transition precode to an AMI code.

26. A system for searching fault locations in a transmission system according to claim 22, wherein said plurality of fault signal transmitters transmit signals of different frequencies, respectively.

27. A system for searching fault locations in a transmission system according to claim 26, wherein each of said plurality of fault signal transmitters transmits a fault signal when the error rate of each repeater section measured by each repeater exceeds a predetermined value.

28. A system for searching fault locations in a transmission system according to claim 22, wherein each of said plurality of fault signal transmitters transmits a fault signal when the error rate of each repeater section measured by each repeater exceeds a predetermined value.

29. A system for searching fault locations in a transmission system according to claim 22, wherein said transmission line coupling said fault signal transmitters with said fault signal receiver is a transmission line of said transmission system.

* * * * *